May 21, 1935.                J. D. BASSON                2,002,074
                         FILM GUIDING MECHANISM
                         Filed Jan. 14, 1931          3 Sheets-Sheet 1
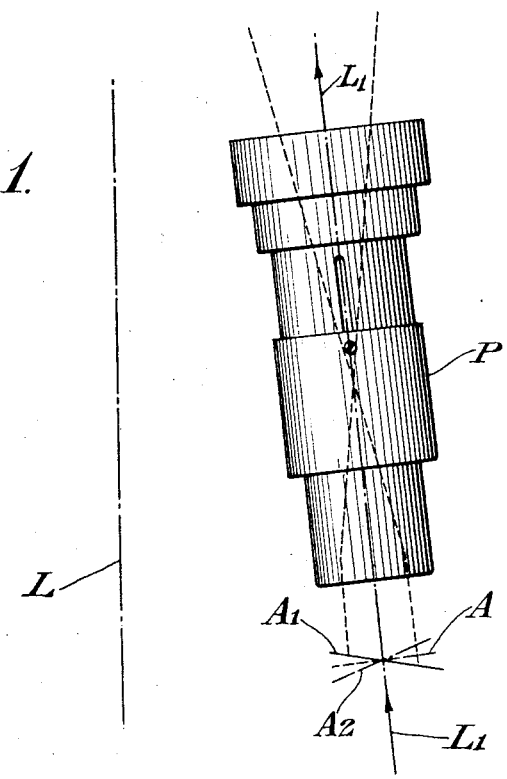
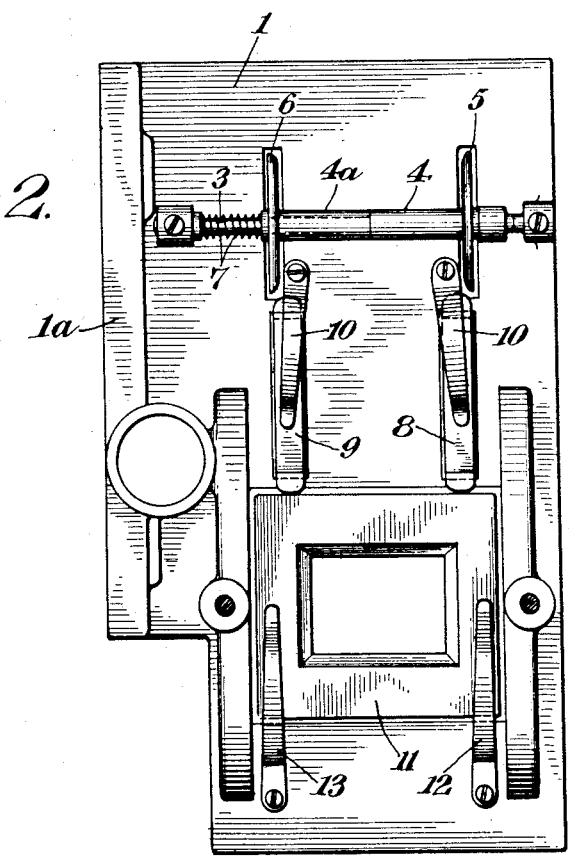
INVENTOR
Joseph D. Basson
BY
Ward, Crosby & Neal
ATTORNEYS May 21, 1935. J. D. BASSON 2,002,074
FILM GUIDING MECHANISM
Filed Jan. 14, 1931 3 Sheets-Sheet 2
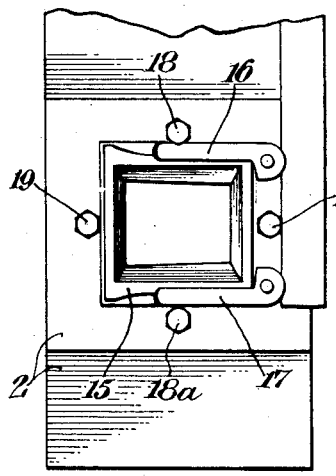
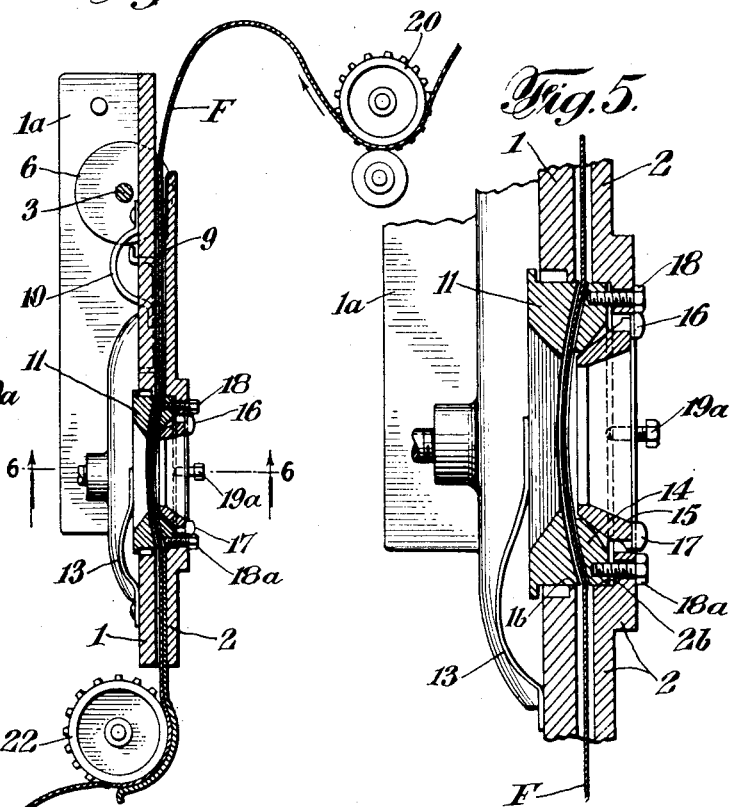
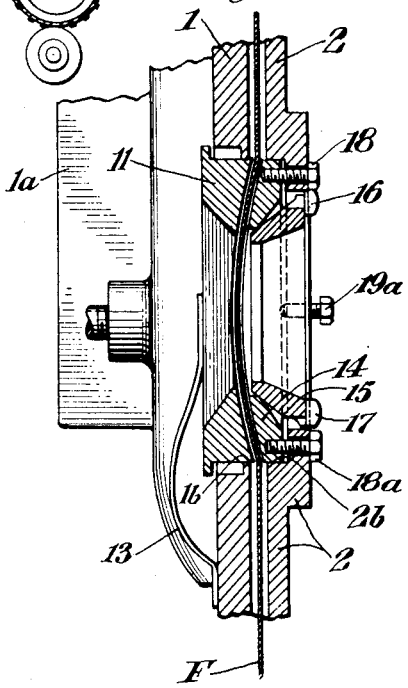
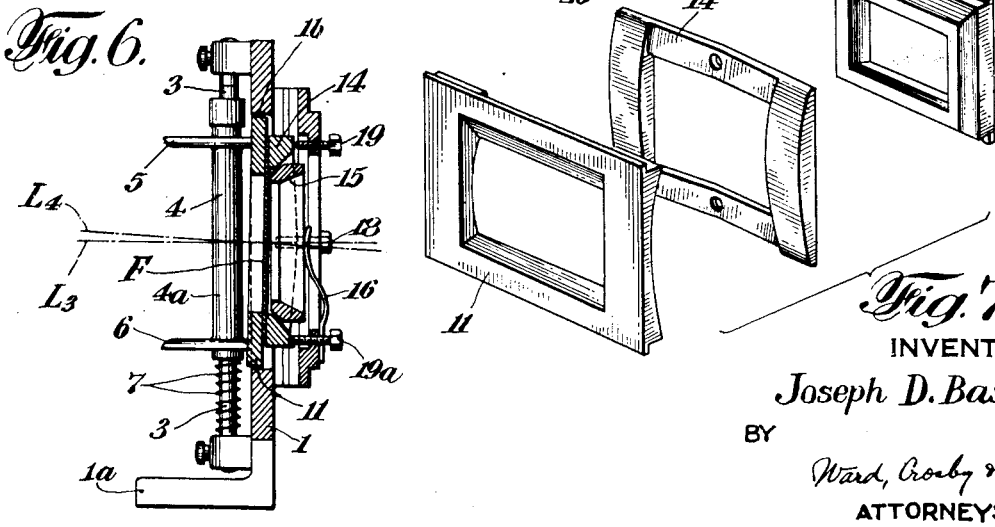
INVENTOR
Joseph D. Basson
BY
Ward, Crosby & Neal
ATTORNEYS May 21, 1935.  J. D. BASSON  2,002,074

FILM GUIDING MECHANISM

Filed Jan. 14, 1931  3 Sheets-Sheet 3

INVENTOR
Joseph D. Basson
BY
Ward, Crosby & Neal
ATTORNEYS

Patented May 21, 1935

2,002,074

UNITED STATES PATENT OFFICE 2,002,074

FILM GUIDING MECHANISM

Joseph D. Basson, Brooklyn, N. Y.

Application January 14, 1931, Serial No. 508,583

8 Claims. (Cl. 88—17)

My invention relates to an arrangement or mechanism whereby a film in tape or web form is caused to traverse a selected path while moving past or with respect to an aperture traversed by a light beam; more particularly, such an arrangement or mechanism is adjustable so that the film path may be obliquely related as desired with respect to the optical axis of an objective lens traversed by said light beam.

More particularly, my invention relates to a projector mechanism and involves an arrangement whereby motion picture film traversing the projection field of such mechanism is caused to move at a desired oblique angle with respect to the optical axis of the objective lens thereof.

My invention also relates to an arrangement whereby a film, as aforesaid, is passed between adjustable members so as to be under suitable tension while moving past or with respect to the aforesaid aperture.

My invention relates to an arrangement of the character stated which is simple, practical and highly satisfactory in operation.

Further advantages, objects and characteristics of my invention will become apparent from the following description taken in connection with the accompanying drawings.

For an understanding of my invention and for an illustration of one of the many forms thereof, reference is to be had to the accompanying drawings, in which:

Figure 1 is a diagrammatic view generally illustrative of my invention;

Fig. 2 is a rear elevational view of a film trap assembly;

Fig. 3 is a longitudinal, vertical sectional view, partly in elevation, of the mechanism shown in Fig. 2;

Fig. 4 is a front elevational view of a part of the mechanism shown in Fig. 3;

Fig. 5 is an enlarged, longitudinal, vertical sectional view, partly in elevation, of a part of the mechanism shown in Fig. 2;

Fig. 6 is a transverse, vertical sectional view, partly in plan, and is taken on the line 6—6 of Fig. 3 looking in the direction of the arrows;

Fig. 7 is a perspective view showing a plurality of passage-forming members in disassembled relation;

Figure 8:
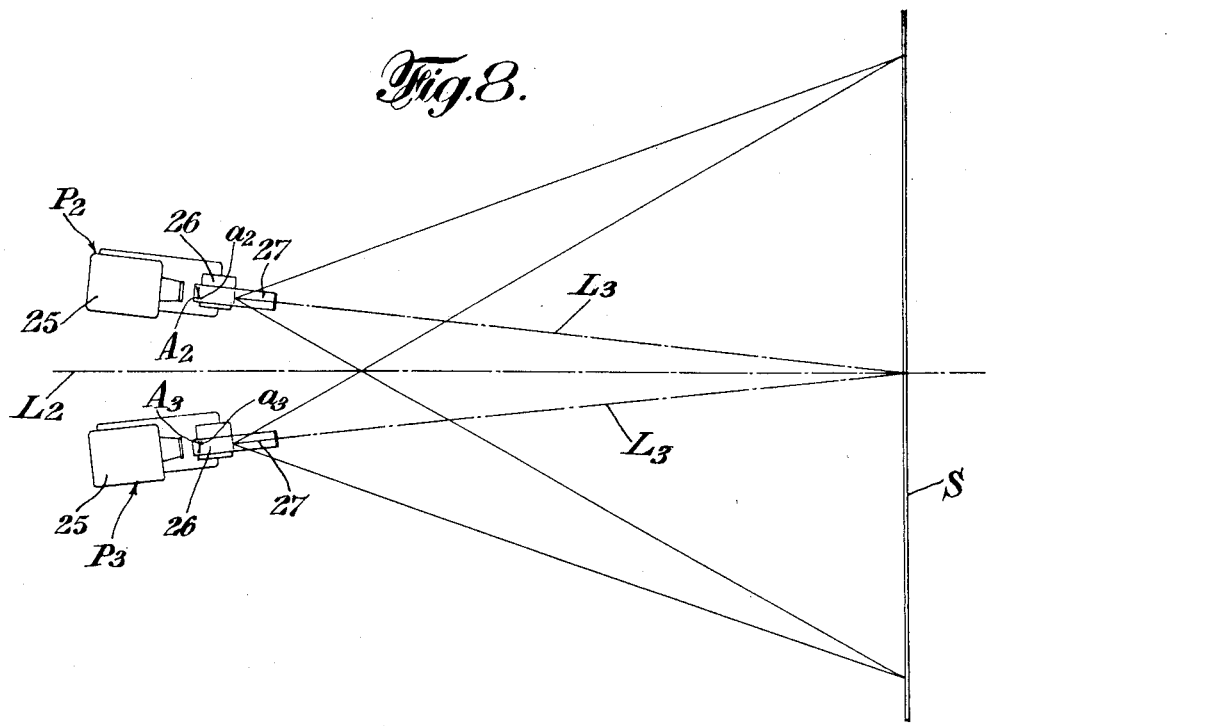
Fig. 8 is a diagrammatic view generally illustrative of my invention.

In the projection art and, more particularly, the motion picture projection art, correct image focus, in the absence of corrective measures, is not obtainable on a vertical screen when the optical axis of the objective or projection lens is obliquely related to the screen.

Thus, in Fig. 1, the line L is shown as disposed at right angles to a suitable projection screen, not shown, but asumed to be vertically disposed in an auditorium or the like, said line L intersecting the center of the screen. Any suitable projection lens P is shown as positioned to one side of the line L and this projection lens is so related to the screen that the optical axis L1 intersects said screen at approximately the point of intersection therewith of the line L. From the foregoing, it follows that the optical axis L1 of the projection lens P is obliquely related to the aforesaid screen.

As stated, the projection lens P is disposed to one side of the screen center line and the relation may be such, if desired and as shown, that a plane which includes the lines L and L1 is approximately horizontally disposed although it shall be understood that the projection lens P may be either above or below the line L to a desired extent whereby a plane including said lines L and L1 is inclined either upwardly or downwardly as the case may be.

As diagrammatically illustrated in Fig. 1, the system is shown as utilized for the projection of motion pictures, the motion picture film being indicated at A. As thus shown, the film A, assuming horizontal disposition of the sheet on which the drawing is made, travels vertically through the projection field and the axis L1 is at right angles with respect to said film.

Under such circumstances, it results, when the axis L1 is obliquely related to the screen as stated, that correct screen image focus is not obtained and, therefore, in accordance with my invention, the film A, in any suitable manner, is caused to move through the projection field along a path such, for example, as indicated at A1 which, however, is still vertical, assuming horizontal disposition of the sheet on which the drawing is made. It results, therefore, that the new path of the film, namely, that indicated at A1 is obliquely related to the optical axis L1 or, in other words, that any given film section, while in the projection field, is in a partly rotated position with respect to the screen whereby correct image focus is obtained.

The mechanism for obtaining the result noted above may assume a variety of forms. One form which has proven satisfactory in practice is herein shown in Figs. 2–7 as comprising the film trap assembly of a device well known in the prior art, this assembly comprising members 1 and 2 detachably secured together in a suitable manner, not shown, to form a path or track for the motion picture film F, or equivalent. The member 1 comprises a flange 1a by which the film trap assembly is secured in proper position to the center frame of the projector.

Carried by the member 1 is a transverse, freely rotatable shaft 3 on which are mounted sleeves 4 and 4a carrying, respectively, the wheels 5 and 6, each of which extends through a slot formed in the member 1, the film F passing between and being guided by the wheels 5 and 6. The sleeve 4 is pinned to the shaft 3 and, therefore, is rotatable therewith. The sleeve 4a, however, is freely rotatable on the shaft 3 and is also movable axially thereof against the force of a spring 7 coiled around said shaft 3, one end of said spring 7 engaging one end of the sleeve 4a and the other end thereof engaging the adjacent shaft bearing. The spring 7 tends to bias the sleeve 4a and wheel 6 from left to right, Fig. 2, whereby the sleeves 4 and 4a are disposed in end-to-end abutting relation. However, under the influence of the film F passing between the wheels 5 and 6, the latter wheel may be moved from right to left, Fig. 2, for a slight distance as determined by the adjacent slot wall, the spring 7 being compressed during this action.

The member 1 is provided with slots through which extend, respectively, the usual tension pads 8 and 9 for the film F, each pad being biased from left to right, Fig. 3, by a spring 10 carried by the member 1 and engaging therewith.

In accordance with my invention, the member 1 comprises a transverse passage or opening 1b in which a passage-defining member 11 is movably supported. As herein illustrated and preferably, the member 11 is movably supported as just described because spring seated, this seating arrangement being of any suitable character such, for example, as is constituted by spaced leaf springs 12 and 13 carried by the member 1 and engaging, at their respective free ends, opposite sides of said member 11 whereby the latter is biased in a direction from left to right, Figs. 3 and 5.

Preferably and in accordance with my invention, the passage-forming member 11 presents a concave surface to the film F, the advantages of this arrangement being hereinafter pointed out.

The aforesaid member 2 comprises a transverse passage or opening 2b substantially alined with the passage 1b in the member 1 and, in accordance with one form of my invention, this passage 2b is adapted to receive a passage-defining structure which constitutes the aperture of the projection system. As herein shown although not necessarily, the aforesaid passage-defining structure comprises a pair of passage-defining members 14 and 15, the latter, in the example shown, defining the aperture of the projection system and the former presenting a convex surface which mates with the aforesaid concave surface of the passage-forming member 11.

To the end that the two passage-defining members 14 and 15 may be secured together, the aperture of the member 14 is arranged to be somewhat larger than that of the member 15 whereby the latter may seat upon the former as shown particularly in Figs. 3 and 5. For retaining the member 15 in this seated relation, there may be utilized leaf springs 16 and 17, each freely pivoted to the member 2 in such manner that they may be positioned as shown in Fig. 4 whereby they engage opposite sides of the member 15 and hold it firmly in seated position.

As clearly shown in Fig. 5, the aforesaid passage-defining member 14 is received in the aperture 2b of the member 2 and, in accordance with my invention, said member 14 is adjustable with respect to said member 2. Any suitable arrangement may thus be utilized such, for example, as herein shown wherein a pair of screws 18, 18a extend freely through passages provided in the member 2 above and below the transverse passage 2b, said screws being threaded, respectively, into the upper and lower sections of the member 14, Fig. 5. At opposite sides of the transverse passage 2b, the respective screws 19, 19a are threaded through and to the member 2, said last named screws coacting, respectively, with opposite side sections of the member 14.

The film trap assembly is shown in Fig. 3 in its normal operative position, the film F traveling in the direction of the arrows and a given section thereof engaging, in succession, a continuously driven sprocket 20, the path defined by the film trap assembly, an intermittently driven sprocket 22, and a continuously driven sprocket 23. Accordingly, individual frames or sections of said film F are successively brought into registering relation with the aperture defined by the passage-forming member 15 which, as stated, forms the aperture of the projection system and through which the projecting light beam passes from left to right as the parts are positioned in Figs. 3, 5 and 6.

Referring particularly to Fig. 6, the line L3 represents the optical axis of the projection lens (the same as in connection with the line L1 of Fig. 1) while the line L4 is shown as extending perpendicular to that film section in alinement with the projection aperture. If the film section is so moved that the line L4 is brought into coinciding relation with the line L3, then said film section would be at right angles to the optical axis of the projecting lens but, since said lines are angularly related, it follows that said film section is obliquely related to the aforesaid optical axis of the projecting lens. This is a characteristic feature of my invention as heretofore explained in connection with Fig. 1.

The above described oblique relation of the film section obtains due to the fact that the passage-forming members 14 and 15 have been angularly adjusted as a unit in a clockwise direction, Fig. 6, about an axis defined substantially by a straight line joining the screws 18 and 18a. This angular adjustment exists due to the fact that the screw 19 is threaded through the member 2 to less extent than is the screw 19a. As stated, the passage-forming member 11 is spring seated and, therefore, this member freely assumes an angular position in correspondence with and as imposed thereon by the member 14. Accordingly, it follows that the path to be followed by the film as it moves with respect to the aperture of the projection system is obliquely related to the optical axis of the projection lens and, obviously, this may be varied as desired by suitably adjusting the screws 19 and 19a.

Since the path of the film past the projection aperture is thus obliquely related to the optical axis of the projection lens, it follows that one edge of the film is nearer the center line of the projection lens than is the other film edge. One edge of the film, therefore, is "near" and the other edge is "far", the near edge being nearer the lens center line and, as the parts are positioned in Fig. 6, it is the upper film edge which is the near edge and the lower film edge which is the far edge. It has been demonstrated in practicing my invention that the film, while passing through the film trap assembly, tends to shift laterally in a direction leading toward the near edge. For this reason, the arrangement should be such that the near edge of the film and the wheel 5 (which is pinned to the shaft 3 through the sleeve 4) are at the same side of the film trap assembly, whereby the film tends to shift laterally toward that guide wheel which is non-movable axially of the shaft 3. Should the arrangement be such that the movable wheel 6 and the near edge of the film are at the same side of the film trap assembly, the lateral film shift causes the wheel 6 to operate in a permanently shifted position, this being contrary to the intended operation of said wheel.

As hereinbefore stated, the passage-forming member 11 may present a concave surface to the film, the passage-forming member 14 which mates therewith presenting a convex surface to said film whereby the latter, as it traverses the projection aperture, takes a configuration such as shown in Figs. 3 and 5 whereby the film section in the projection aperture at any given time has a shape corresponding with a peripheral section of a cylinder. This is advantageous because that film section in the projection field at any given time is so curved that the center thereof is further from the screen than are the top and bottom edges thereof. Accordingly, better focus exists on the screen than is the case when the film section in the projection field is of plane configuration. The cylindrical film shape is also advantageous because somewhat increasing the tension of each film section while passing through the projection field to thereby overcome or decrease film irregularities. It shall be understood, however, that the members 11 and 14, or equivalent, may be of such different shape as desired whereby the film may be of substantially plane configuration while passing through the projection aperture.

As is well understood to those skilled in the art, the members 1 and 2 are detachably but positively retained in the relation shown. By manipulating suitable mechanism, not shown, the member 2 may be moved from the member 1 when it becomes necessary to rethread the film or to gain access to the interior of the film trap assembly.

Referring to Fig. 8, P2 and P3 represent a pair of projectors of any suitable type such, for example, as are ordinarily utilized for commercial front projection. In the example shown, although not necessarily, the projectors P2 and P3 are focused upon the rear of a suitable translucent, vertically disposed screen structure S, the projecting light beam passing therethrough in order to reach the audience, and the projectors P2 and P3 being used alternately as well understood. As illustrated, each projector comprises a lamp house 25, a mechanism housing 26 and a film magazine 27. Each projector preferably comprises a wide-angle lens combination such, for example, as described and claimed in the copending Bowen applications Serial No. 316,403, filed November 1, 1928, and Serial No. 420,937, filed January 15, 1930. With such wide-angle lens combinations, the distance between the screen and projectors is much less than is necessary with an ordinary projection lens and, accordingly, rear projection is rendered practical in the limited space usually existing on the stage of an ordinary theatre.

In Fig. 8, the line L2 is the center line of the screen structure S. This line is disposed at right angles with respect to the screen structure and intersects the center thereof. The projectors P2 and P3 are disposed, respectively, at opposite sides of said line L2, the optical axis L3 of the respective projectors being obliquely related to the screen structure S. The projectors P2 and P3 are shown, respectively, as having motion picture films A2 and A3 disposed therein and each of these films, assuming horizontal disposition of the sheet on which the drawings are made, travels vertically with respect to its projection field or aperture and is disposed at right angles to the optical axis of its projection lens.

Under such circumstances, the image on the screen structure S may not be properly focused in one or both of the side areas thereof for the reason that the light paths from either projector to opposite sides of the screen structure are dissimilar in length. However, in accordance with my invention, the film trap assembly of each projector mechanism may be constructed and arranged as herein described, or in an equivalent manner, so that each section of the film A2, as it passes through its projection aperture, is obliquely related, as at a2, to its projection axis and each section of the film A3, as it passes through its projection aperture, is obliquely related, as at a3, to its projection axis. When the aforesaid oblique relation of the films is properly obtained, it results that there is obtained proper or satisfactory focus of the image throughout the area of the screen structure S.

In connection with Fig. 8, it is to be noted that the film trap assembly arranged as heretofore described in Figs. 2-7 is adapted for use with the projector P3. This appears from a consideration of Fig. 6 wherein the adjustment is such that the film F is obliquely related in a clockwise sense to the optical axis of the associated projection lens. To adapt the film trap assembly of said Figs. 2-7 for use with the projector P2 of Fig. 8, the adjustment should be such that the film F is obliquely related in a counter-clockwise sense to the optical axis of the associated projection lens. Under the circumstances last recited, the respective positions of the wheels 5 and 6 should be the reverse of that shown in Fig. 6.

With the film trap assembly in normal position as shown in Figs. 3 and 5, the passage-defining members 11, 14 and 15 may be adjusted by proper manipulation of the screws 19 and 19a so as to move substantially about a vertical axis as defined by the screws 18 and 18a all as hereinbefore described. In this manner, the path for the film through the projection aperture may be chosen as desired either clockwise or counter-clockwise, Fig. 6, with respect to that path which is at right angles with respect to the line L3. As stated, the proper adjustment is thus effected when the projector is to one side or the other of a line intersecting the screen at right angles to the center thereof.

In the event that the projector is positioned a substantial distance either above or below the aforesaid center line of the screen, it may be desirable to compensate for improper image focus on the screen structure because of this relation. This may be accomplished within limits with the form of mechanism herein described. Thus, should the projector be positioned well above said screen center line, the screw 18a may be retracted and the screw 18 advanced whereby the projection aperture is moved about a horizontal axis with resultant correction of the image focus.

Further, it shall be understood that the adjustment may be "universal" in the sense that the projection aperture may be adjusted about a vertical axis as defined by the screws 18 and 18a, and also about a horizontal axis as just described.

With the form of my invention herein described, the passage-forming member 15 may readily be removed so that there may be substituted therefor a similar member with an aperture of different area. As well and as stated, the passage-forming members 14 and 15 may be replaced by a single member which is adjusted as hereinbefore described in connection with the member 14 or in an equivalent manner. This single member may be adapted to slidably or otherwise receive one or more plates with apertures of different areas whereby the projector may be adapted for use with different types of film.

Since the passage-forming member 11 is spring-seated and since the passage-forming member 14 coacts therewith to maintain the springs for said member 11 under more or less tension, it results that said passage-forming members 11 and 14 tend to and do grip that film section in alinement with the projection aperture in a yielding manner, whereby the film is held under tension. This is an advantageous feature of my invention. This film tensioning phase of the invention, it shall be understood, is not to be limited to those arrangements wherein the aforesaid oblique relation of the film section obtains since the film may be variably tensioned in a desired manner by an arrangement such as herein described, or the equivalent thereof, when that film section in alinement with the projection aperture is disposed, as in present commercial practice, at right angles with respect to the axis of the projection lens.

It is well understood in the projection art that, in the absence of corrective measures, a keystone effect exists on the screen when the axis of the projecting light beam is in non-coinciding relation with respect to the screen center line, i. e. that line which intersects the center of the screen and is disposed at right angles with respect thereto. Thus, in Fig. 9, if the projection aperture of the projector P3 is rectangular as indicated by the broken lines at 30, the border of the image area on the screen structure S defines a keystone, as indicated by the broken lines at 30a, this result obtaining due to the provision of the rectangular aperture and further due to the fact that the axis of the projecting light beam is obliquely related to said screen structure S as shown in Fig. 8.

Figure 9:
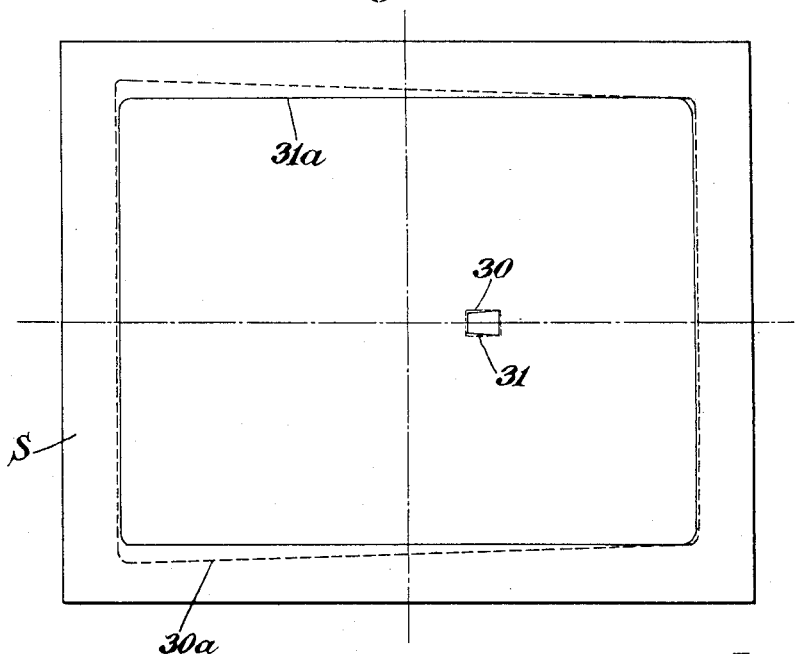
Fig. 9 is a diagrammatic view illustrative of a phase of my invention.

To avoid this keystone effect of the border of the image area, the projection aperture of the projector P3 may itself define a keystone as indicated by the full lines at 31, Fig. 9, the latter keystone being oppositely related to the keystone 30a as produced by a rectangular projection aperture. Accordingly, with a keystone projection aperture as indicated at 31, Fig. 9, the periphery of the image area on the screen structure S defines substantially a rectangle as shown at 31a, Fig. 9. With the form of my invention herein shown, the passage-forming member 15 defines the projection aperture as stated above and, under such circumstances, this member 15 preferably has the keystone configuration shown at 31, Fig. 9.

In connection with my invention, it is to be noted that the keystone effect of the screen image area border may be overcome otherwise than as stated above. Thus, if the film is caused to pass through the projection field in some position such as indicated at A2, Fig. 1, the keystone effect of the image area border may be wholly or partly overcome, this position being obtained with the form of my invention herein shown by proper manipulation of the screws 19, 19a. Ordinarily, however, the keystone effect is not eliminated as just stated because, with the arrangement shown, such a position of the film in the projection field results in an undesired focus condition.

While the invention has been described with respect to a certain particular preferred example which gives satisfactory results, it will be understood by those skilled in the art after understanding the invention, that various changes and modifications may be made without departing from the spirit and scope of the invention and it is intended therefore in the appended claims to cover all such changes and modifications.

What is claimed as new and desired to be secured by Letters Patent is:

1. In a device of the character described, the combination with an objective lens, of passage-forming mechanism for guiding a film along a path intersecting a light beam traversing said objective lens, and means carried by said mechanism for obliquely relating said film to the optical axis of said objective lens, said means being movable with respect to said mechanism and coacting directly with said film.

2. In a device of the character described, the combination with an objective lens, of separable members for guiding a film along a path intersecting a light beam traversing said objective lens, and means carried by said members for obliquely relating said film to the optical axis of said objective lens, said means being movable with respect to said members and coacting directly with said film.

3. In a device of the character described, the combination with an objective lens, of separable members for guiding a film along a path intersecting a light beam traversing said objective lens, and means carried by said members for obliquely relating said film to the optical axis of said objective lens, said means comprising a passage-forming member defining the projection aperture of said device.

4. In a projector, the combination with the film trap assembly having members movable with respect to each other, of passage-forming members carried by said first named members respectively, said passage-forming members defining the path of movement of a motion picture film through the projection field of said projector, and means for adjusting said passage-forming members with respect to said first named members.

5. In a projector, the combination with the film trap assembly having members movable with respect to each other, of passage-forming members carried by said first named members respectively, said passage-forming members defining the path of movement of a motion picture film through the projection field of said projector, and means for adjusting said passage-forming members with respect to said first named members about either a substantially horizontal or a substantially vertical axis.

6. In a projector, the combination with the film trap assembly having members movable with respect to each other, of passage-forming members carried by said first named members respectively, said passage-forming members defining the path of movement of a motion picture film through the projection field of said projector, means for adjusting one of said passage-forming members with respect to the axis of said projection field, and means for biasing another of said passage-forming members toward said one passage-forming member.

7. In a projector, the combination with the film trap assembly having members movable with respect to each other, of passage-forming members carried by said first named members respectively, said passage-forming members defining the path of movement of a motion picture film through the projection field of said projector, means for adjusting one of said passage-forming members about either a substantially vertical or a substantially horizontal axis with respect to the axis of said projection field, and means for biasing another of said passage-forming members toward said one passage-forming member.

8. In a projector, the combination with the film trap assembly having members movable with respect to each other, of passage-forming members carried by said first named members respectively, said passage-forming members defining the path of movement of a motion picture film through the projection field of said projector, means for adjusting one of said passage-forming members with respect to the axis of said projection field, said means comprising a pair of screws threaded to one of said first named members and another pair of screws extending loosely through said one of said first named members, and means for biasing another of said passage-forming members toward said one passage-forming member.

JOSEPH D. BASSON.